United States Patent
Hong et al.

(10) Patent No.: US 10,019,536 B2
(45) Date of Patent: Jul. 10, 2018

(54) SNAPSHOT-CONSISTENT, IN-MEMORY GRAPH INSTANCES IN A MULTI-USER DATABASE

(71) Applicant: Oracle International Corporation, Redwood Shores, CA (US)

(72) Inventors: Sungpack Hong, Palo Alto, CA (US);
Zhe Wu, Mountain View, CA (US);
Martin Sevenich, Palo Alto, CA (US);
Jayanta Banerjee, Nashua, NH (US);
Hassan Chafi, San Mateo, CA (US);
Korbinian Schmid, Munich (DE)

(73) Assignee: Oracle International Corporation, Redwood Shores, CA (US)

( * ) Notice: Subject to any disclaimer, the term of this patent is extended or adjusted under 35 U.S.C. 154(b) by 310 days.

(21) Appl. No.: 14/332,182

(22) Filed: Jul. 15, 2014

(65) Prior Publication Data
US 2016/0019228 A1 Jan. 21, 2016

(51) Int. Cl.
*G06F 7/00* (2006.01)
*G06F 17/30* (2006.01)

(52) U.S. Cl.
CPC .. *G06F 17/30958* (2013.01); *G06F 17/30327* (2013.01); *G06F 2201/80* (2013.01)

(58) Field of Classification Search
None
See application file for complete search history.

(56) References Cited

U.S. PATENT DOCUMENTS

| | | | |
|---|---|---|---|
| 9,116,738 B2 * | 8/2015 | Jacob | G06F 9/46 |
| 9,244,983 B2 * | 1/2016 | Yang | G06F 17/30958 |
| 9,507,956 B2 * | 11/2016 | Snelling | G06F 21/6218 |
| 2007/0185881 A1 * | 8/2007 | Vienneau | G06F 17/30362 |
| 2011/0142217 A1 * | 6/2011 | Goldfarb | H04M 15/00 379/126 |
| 2012/0096043 A1 * | 4/2012 | Stevens, Jr. | G06F 17/30958 707/798 |
| 2013/0151456 A1 * | 6/2013 | Gionis | G06N 5/003 706/47 |
| 2014/0282356 A1 * | 9/2014 | Mills | G06F 17/30958 717/101 |

(Continued)

OTHER PUBLICATIONS

Pey, Larriba, "News and Events—Performance in Action", Management of Mobile Device Data, Sparsity-Technologies, http://sparsity-technologies.com/blog/, last viewed on May 6, 2015, 11 pages.

(Continued)

*Primary Examiner* — Cheyne D Ly
(74) *Attorney, Agent, or Firm* — Hickman Palermo Becker Bingham LLP; Daniel D. Ledesma (57) ABSTRACT

Techniques for storing and processing graph data in a database system are provided. Graph data (or a portion thereof) that is stored in persistent storage is loaded into memory to generate an instance of a particular graph. The instance is consistent as of a particular point in time. Graph analysis operations are performed on the instance. The instance may be used by multiple users to perform graph analysis operations. Subsequent changes to the graph are stored separate from the instance. Later, the changes may be applied to the instance (or a copy thereof) to refresh the instance.

23 Claims, 5 Drawing Sheets

(56) References Cited

U.S. PATENT DOCUMENTS

2015/0186427 A1* 7/2015 Logothetis ........ G06F 17/30958
707/776

OTHER PUBLICATIONS

Neo4j Graph Database, "What is a Graph Database?", http://neo4j.com/developer/graph-database/, last viewed on May 6, 2015, 7 pages.
Giraph "Introduction to Apache Giraph", http://giraph.apache.org/intro.html, last viewed on May 6, 2015, 2 pages.
Dato.com, "GraphLab Create User Guide", Introduction, 1 page, last viewed on May 6, 2015, 1 page.
Hong, U.S. Appl. No. 14/680,150, Filed Apr. 7, 2015, Notice of Allowance dated Apr. 24, 2018.

* cited by examiner

SNAPSHOT-CONSISTENT, IN-MEMORY GRAPH INSTANCES IN A MULTI-USER DATABASE

BACKGROUND

Graph analysis is an important type of data analytics where the underlying data-set is modeled as a graph. Since such a graph representation captures relationships between data entities, applying graph analysis procedures can provide valuable insight about the original data-set to the user. Examples of popular graph analysis procedures are Community Detection, PageRank, Shortest Path Finding, and Link Prediction.

Performing graph analysis can be a resource- and time-intensive process. In one approach, a graph database system stores graph data in a database and provides APIs that allow users to manipulate the graph data. However, the performance of such an approach is typically poor, especially for large graphs. This is because such an approach involves many relatively small-sized random data accesses. Contemporary persistent stores are very inefficient at such data access patterns.

In another approach, an analytic engine loads an entire graph from a file system into main memory of a machine and then executes graph analysis procedures in-memory, thereby avoiding random disk accesses. However, such an approach does not take into account data management aspects, which are necessary for real-world operations. Also, such an approach does not support concurrent users. Instead, it is assumed that all the hardware resources are exclusively used by a single user.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Techniques are provided for a graph database system that supports both data management in persistent storage and efficient in-memory graph analytics. The graph database system includes a scalable relational database and an in-memory graph analytic engine. With the relational database, the graph database system supports snapshot-based consistency of in-memory graph instances. The in-memory graph analytic engine of the graph database system is responsible for efficient execution of graph analysis procedures. The in-memory graph analytic engine may apply delta updates from the persistent storage to in-memory graph snapshots.

Database Overview

Generally, a server, such as a database server, is a combination of integrated software components and an allocation of computational resources, such as memory, a node, and processes on the node for executing the integrated software components, where the combination of the software and computational resources are dedicated to providing a particular type of function on behalf of clients of the server. A database server governs and facilitates access to a particular database, processing requests by clients to access the database.

A database comprises data and metadata that is stored on a persistent memory mechanism, such as a set of hard disks. Such data and metadata may be stored in a database logically, for example, according to relational and/or object-relational database constructs. Database applications interact with a database server by submitting to the database server commands that cause the database server to perform operations on data stored in a database. A database command may be in the form of a database statement. For the database server to process the database statements, the database statements must conform to a database language supported by the database server. One non-limiting example of a database language that is supported by many database servers is SQL, including proprietary forms of SQL supported by such database servers as Oracle, (e.g. Oracle Database 11g). SQL data definition language ("DDL") instructions are issued to a database server to create or configure database objects, such as tables, views, or complex types.

Generally, data is stored in a database in one or more data containers, each container contains records, and the data within each record is organized into one or more fields. In relational database systems, the data containers are typically referred to as tables, the records are referred to as rows, and the fields are referred to as columns. In object-oriented databases, the data containers are typically referred to as object classes, the records are referred to as objects, and the fields are referred to as attributes. Other database architectures may use other terminology. Systems that implement the present invention are not limited to any particular type of data container or database architecture. However, for the purpose of explanation, the examples and the terminology used herein shall be that typically associated with relational or object-relational databases. Thus, the terms "table", "row" and "column" shall be used herein to refer respectively to the data container, record, and field.

Graph Database System Overview

Figure 1:
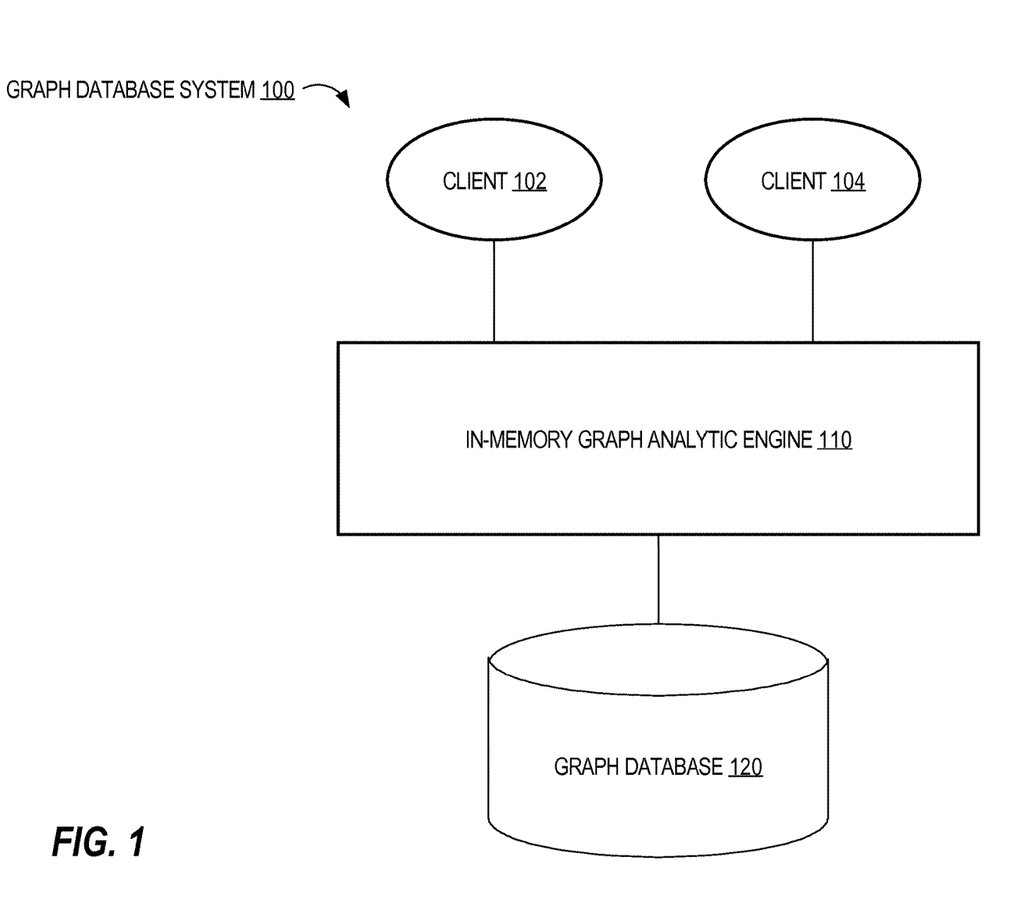
FIG. 1 is a block diagram that depicts an example graph database system, in an embodiment.

FIG. 1 is a block diagram that depicts an example graph database system 100, in an embodiment. Graph database system 100 includes a graph database 120 that stores graph data, an in-memory graph analytic engine 110, and clients 102 and 104 that send requests to and receive responses from graph analytic engine 110. While only two clients 102-104 are depicted, graph database system 100 may support many more clients. Also, while FIG. 1 depicts client 102-104 as directly connected to graph analytic engine 110, clients 102-104 may be, instead, communicatively coupled to graph analytic engine 110 over one or more networks (not shown). Clients 102 and 104 may be in the same or different networks relative to each other.

Graph Data

As noted previously, graph database 120 stores graph data about one or more graphs, each comprising multiple nodes and edges. If graph database 120 stores multiple graphs, then each graph represents a different set of data that is to be treated separately for graph analysis purposes. For example, one graph set may reflect relationships among users in one social network while another graph set may reflect relationships among users in another social network. As another example, one graph set may reflect relationships among users in a social network while another graph set may reflect connections among computing devices in a network.

Graph database 120 may be a relational database or an object database. For example, one node table in graph database 120 may include a row for each node in a graph. (Graph database 120 may store a different node table for each graph represented in the graph data.) Each column in the node table may correspond to a different attribute or property of the node, such as a name, an age, and a date, depending on the type of object the nodes represent.

Graph database 120 may also store an edge table that corresponds to the node table. Each row in the edge table corresponds to a different edge in the graph and each column in the edge table corresponds to a node that is connected to by another node through the corresponding edge. Thus, the edge table may have at least two columns, one for each of two nodes. The edge table may also have additional columns, each additional column corresponding to an attribute or characteristic about the corresponding edge.

Nodes in a graph may represent one of many different types of objects while edges that connect two nodes in the graph may represent one of many different types of relationships between the objects. Embodiments are not limited to any particular type of object or type of relationship.

For example, nodes in a graph may represent user accounts maintained by a social network that is provided by a social network provider, such as Facebook, Google+, LinkedIn, and Twitter. An edge in such a graph may represent that the two connecting nodes have established a relationship with each other or that one of the connecting nodes has decided to "follow" the other node (as in Twitter).

As another example, nodes in a graph may represent a network, such as the Internet, and edges in the graph may represent that computing devices are physically coupled to each other.

When a graph is stored in memory from graph database 120, the names or identifiers of each node may be converted to a different value. For example, if a node represents a user account (e.g., "johnsmith1986") maintained by a social network provider, then the user identifier that identifies that user account for the social network provider may be mapped to another value, such as 2032, indicating that the user account is at least one of 2032 (or 2033) user accounts in the graph. Thus, the data and, optionally, the format of a graph that is stored in graph database 120 may be different than the data and format of the corresponding graph in memory. Furthermore, the values of node identifiers in memory may be later mapped back to their respective original values that identify real-world objects, such as email addresses, IP addresses, MAC addresses, or social network account identifiers.

In-Memory Graph Analytic Engine

In-memory graph analytic engine 110 performs one or more graph analytic operations on a "graph instance" that is loaded from graph database 120 and stored in-memory of one or more computing devices (or nodes). A graph instance is an in-memory version of a graph whose nodes and edges are stored in graph database 120. A graph instance is considered a snapshot of a graph at a particular point in time. Thus, a graph instance is associated with a transaction identifier, a timestamp, or an internal system clock number, such as a system change number (SCN). If another graph instance is generated based on another version of the same graph that includes one or more subsequent changes (e.g., an insertion or deletion of a node), then that graph instance is associated with a different transaction ID, timestamp, or SCN. While embodiments are not limited to any type of value that is used to indicate a particular point in time, the following examples are in the context of a transaction ID.

In-memory graph analytic engine 110 may be implemented in hardware, software, or any combination of hardware and software. For example, in-memory graph analytic engine 110 may execute on one or more nodes, each comprising one or more processors and memory (such as random access memory (RAM)) that stores instructions that are executed by the one or more processors. Even though FIG. 1 depicts a single item for in-memory graph analytic engine 110, in-memory graph analytic engine 110 may be implemented on a single computing device or on multiple computing devices.

In-memory graph analytic engine 110 functions as a server for clients 102 and 104. Each client connects to in-memory graph analytic engine 110 and requests certain types of tasks, such as loading a graph into memory and performing graph analytic operations, including returning information about a graph, adding nodes and edges to a graph, deleting nodes and edges from a graph, and updating properties or attributes of nodes/edges of a graph. Thus, in-memory graph analytic engine 110 translates client requests into graph operations that a storage device that stores graph database 120 recognizes or is configured to process.

Client requests (e.g., from clients 102 and 104) may conform to a standard or proprietary set of APIs, such as BluePrint API.

Each graph stored in graph database 120 may be associated with a graph identifier that uniquely identifies the graph relative to other graphs that are also stored in graph database 120. Thus, in-memory graph analytic engine 110 may translate a graph name (that is specified or otherwise indicated in a client request) to a graph identifier.

In response to receiving a client request, in-memory graph analytic engine 110 sends a retrieval request to graph database 120 for a particular graph. The retrieval request may indicate (in addition to a graph identifier) that all the nodes and edges of a particular graph are to be retrieved. Alternatively, the retrieval request may indicate one or more filter criteria that are used to filter out nodes and/or edges from the graph that is stored in graph database 120. For example, one filter criterion may be age of a node, such as all nodes that were added to the graph more than two days ago. Thus, any nodes older than two days are not part of the corresponding graph instance (i.e., that is created in-memory). Thus, a graph instance may not reflect all the nodes and edges of the graph at the particular time that is associated with the graph instance.

Filter criteria may be applied by graph database 120 or by in-memory graph analytic engine 110. For example, if a filter criterion is "NODE.age>10", then in-memory graph analytic engine 110 may request graph database 120 for all nodes that have an age attribute value that is greater than 10. As another example, filter criteria for an edge may be "source.color=blue and destination.color=red", in which case in-memory graph analytic engine 110 applies the filter criteria while creating a graph instance by checking the value of the attribute 'color' of each end of each edge. Applying such filter criteria may require a join and in-memory graph analytic engine 110 may be much more efficient than graph database 120 at performing joins.

Instead of creating a graph instance in memory in response to a client request, in-memory graph analytic engine 110 may load a graph instance prior to any client request for data regarding the corresponding graph. For example, upon startup, in-memory graph analytic engine 110 may load one or more graph instances, such as those graphs that are most frequently requested by clients.

Example Graph Instance

Figure 2:
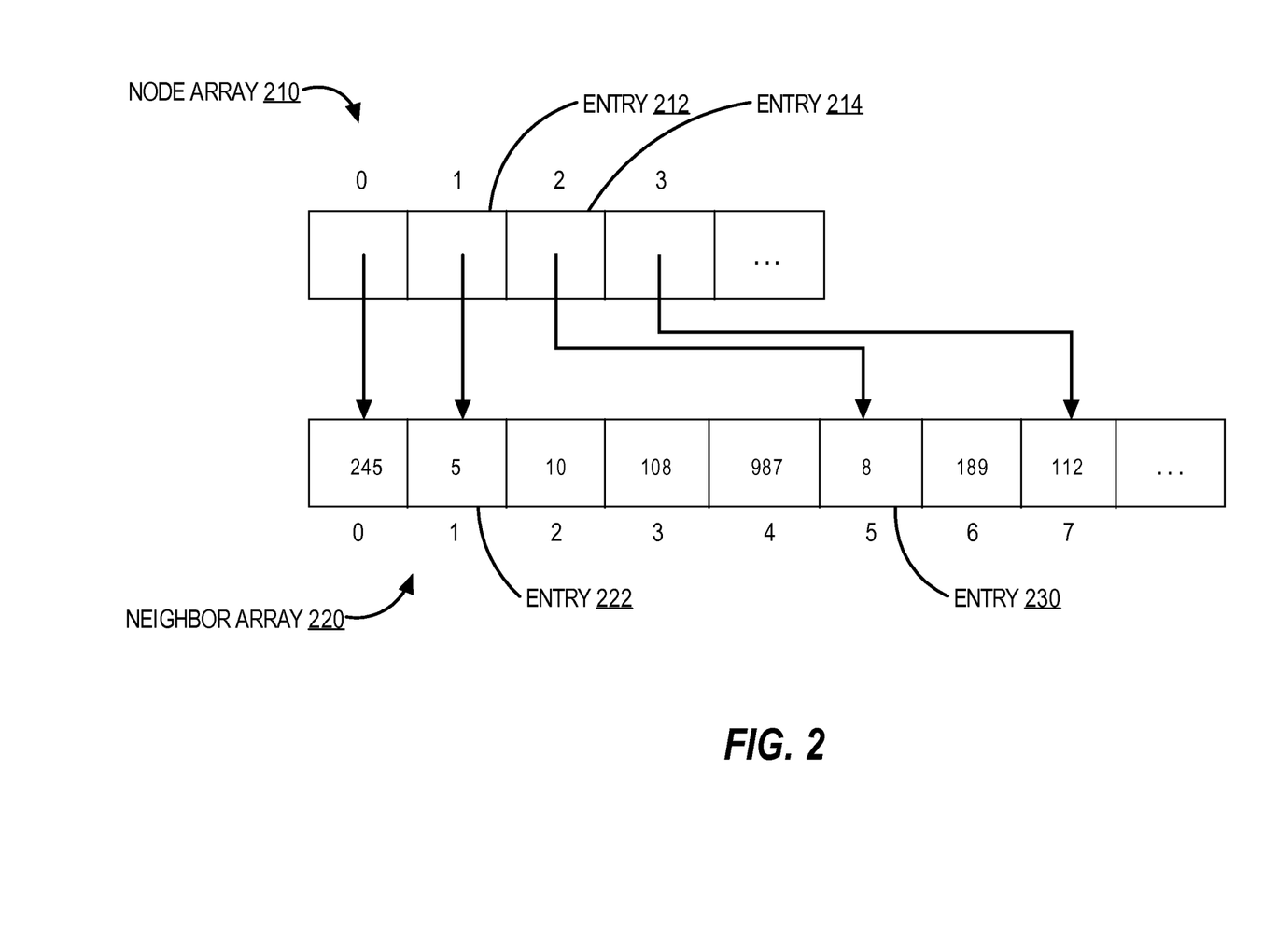
FIG. 2 is a block diagram that depicts an example graph instance, in an embodiment.

A graph may be represented in any number of ways. Embodiments are not limited to any particular representation. FIG. 2 is a block diagram that depicts two arrays of a graph instance: a node array 210 and a neighbor array 220, in an embodiment. Each entry in node array 210 corresponds to a different node in a graph and includes a value (e.g., an index, a reference, or a pointer) that is used to identify an entry in neighbor array 220. For example, if a user of a social networking service has 1029 friends (or registered contacts) and a node in node array 210 corresponds to that user, then neighbor array 220 would include 1029 entries, one for each "friend" of the user.

In an embodiment, each of one or more entries in node array 210 includes one or more data values that indicate information about the corresponding node. For example, an entry in node array 210 includes a data value for one or more properties of the corresponding node. As noted previously, a property of a node may be a name, an age, a date, a time, a salary, or a description of some kind.

The "pointed-to" entry in neighbor array 220 that is "pointed to" by a "pointing" entry in node array 210 indicates that the node represented by the "pointed-to" entry is a "neighbor" of the node represented by the "pointing" entry. For example, entry 212 in node array 210 may include an index value (e.g., '1') that corresponds to entry 222 in neighbor array 220. Thus, with respect to entry 222, entry 222 is a "pointing" entry. Entry 212 is the second position in node array 210. If each node in a graph (that comprises N nodes) is given a unique value from 0 to N−1, then entry 212 corresponds to node '1' which can be used to index into node array 210 at the second position. Entry 222 includes the value '5', indicating that it can be used to index into node array 210 at the sixth position.

The neighbors of a particular node indicated in node array 210 may be determined based on (1) the "pointed-to" entry (in neighbor array 220) that the "pointing" node indicates (or references) and (2) the entry (in neighbor array 220) that the node subsequent to the "pointing" node in node array 210 indicates (or references). For example, entry 212 indicates (or references) entry 222 in neighbor array 220. Entry 214 indicates (or references) entry 230. All entries between entry 222 and entry 230 (including entry 222 and excluding entry 230) are neighbors of entry 212. Thus, the neighbors of the node indicated by entry 212 are nodes 5, 10, 108, and 987.

The set of neighbors that are indicated in neighbor array 220 and that correspond to a particular node in node array 210 is referred to herein as the "neighbor list" of the particular node. Each neighbor list is indicated by a contiguous set of entries in neighbor array 220.

In an embodiment, each neighbor list in neighbor array 220 is sorted by node value. If each neighbor list in neighbor array 220 is not sorted initially, then each neighbor list may be ordered before graph analysis operations are performed on the graph instance, such as identifying common neighbors or counting triangles.

In a related embodiment, an entry in node array 210 includes two values that are used to identify neighbors of the entry. For example, entry 212 may include the values '1' and '4'. The neighbor list of entry 212 may then be determined as the nodes between (and including) the second entry and the fifth entry in neighbor array 220.

Snapshot Consistency

As noted previously, a graph instance is an in-memory version of a graph that is stored in a graph database (e.g., graph database 120). The graph instance is a read-only snapshot of the graph at a particular point in time. There is a transaction to which the graph instance is consistent in the graph database. Consistency is important because there may be concurrent updates to the graph while the corresponding graph data is loaded from the graph database. After the graph data is loaded into memory and a graph instance is generated, the graph instance becomes a read-only snapshot.

In an embodiment, a graph instance is associated with a transaction identifier. The transaction identifier is associated with the transaction in which the creation of the graph instance occurred.

A graph instance stays unmodified while an in-memory graph analytic engine is performing one or more graph operations on the graph instance, for example, in response to a client request. Examples of graph operations include identifying neighbors, counting triangles, traversing a graph in a breadth-first order or in a depth-first order, identifying incoming neighbors, computing a page rank of nodes in a graph, computing conductance of a graph, finding shortest paths between nodes, and computing connected components of a graph. (A "conductance" of a graph measures how "well-knit" the graph is, A "connected component" in a graph is a set of nodes where, for every node in the set, there is a path to every other node in the set).

In an embodiment, a graph instance is not allowed to be modified. Instead, any modifications (for example, initiated by one or more client requests) are stored separately from the graph instance, such as in graph database 120. Additionally or alternatively, the modifications may initiate creation of another graph instance that reflects the modifications to the previous graph instance. Thus, two graph instances may be stored simultaneously in memory.

In a related embodiment, if only a single client is using a graph instance, then the client may send a request that makes the graph instance private to the client so that no other client may access the graph instance. With a private graph instance, a client may initiate one or more modifications to the graph instance and initiate one or more graph analysis operations for in-memory graph analytic engine 110 to perform on the modified graph instance.

In a related embodiment, a user may create private, non-persistent data properties for purposes of analysis. For example, a client request may declare a data property for each node that stores the result of page rank analysis. Originally, the graph does not have a node property that stores a page rank. Thus, one or more client requests must (1) declare a temporary node property; (2) initiate a page ranking process to generate a page rank for multiple nodes in a graph instance; and (3) initiate analysis of the result of the page ranking process, such as identifying the top one hundred nodes in the graph instance based on page rank. The page rank values may be discarded when the graph instance is deleted from memory or when no clients are accessing the graph instance. Alternatively, the page rank values may be stored persistently in graph database 120 (e.g., automatically or in response to user input) along with the node and edge information of the corresponding graph.

Delta Updates

Regardless of whether a graph instance may be modified, the corresponding graph data stored in graph database 120 may be modified in response to a client request. A (e.g., subsequent) client request may request in-memory graph analytic engine 110 to create another "snapshot" (or instance) of the same graph in which recent updates are reflected in the (new) snapshot.

Information about changes to a graph is referred to herein as "delta information." Applying delta information to a graph instance to create a new (updated) graph instance is much faster than creating a graph instance from graph data stored in graph database 120. The initial loading of a graph into memory from graph database 120 may take a significant amount of time, especially if the entire graph is read.

In an embodiment, in-memory graph analytic engine 110 monitors modifications to the corresponding graph stored in graph database 120. In-memory graph analytic engine 110 may keep track of the following events: (1) addition/removal of a node/edge in the graph; (2) addition/removal of a property key of a node or edge in the graph; and (3) modification of a property value of a node or edge in the graph. Each of the foregoing events is recorded and is an example of "delta information."

Delta information may be stored in any format, such as a list of entries in a log. Each log entry may contain information that identifies the type of change (e.g., remove a node or edge) and one or more node identifiers. If the change is the deletion or removal of an edge, then the log entry may include two node identifiers, one for each node to which the edge connects.

Delta information may be maintained in memory by in-memory graph analytic engine 110. Additionally or alternatively, delta information is stored in persistent storage, such as graph database 120, so that the changes reflected in the delta information are persisted. To apply delta information to a graph instance in memory, the delta information may need to be first read from persistent storage. Alternatively, the delta information may already be stored in memory and is accessible by in-memory graph analytic engine 110. Thus, a retrieval request from in-memory graph analytic engine 110 to the persistent storage may be avoided.

Delta information is associated (or "tagged") with a transaction identifier (ID). If multiple updates were made to a graph in a single transaction, then the delta information for those updates share (or are associated with) the same transaction ID.

In an embodiment, delta information is sorted by the position of the affected node or edge in the corresponding graph instance. Delta information for the same node or edge may be stored in the same order as the corresponding changes occurred, according to transactional semantics. Sorting enables a relatively fast creation of a new snapshot using the current graph instance and the delta information instead of loading the corresponding graph data from graph database 120 to create the new snapshot.

Creating a New Snapshot of a Graph

A new snapshot (or instance) of a graph may be created for one of multiple reasons. For example, a client request may explicitly request in-memory graph analytic engine 110 to create a new snapshot (of a graph instance) that contains the most recent data for the graph, which data may be store in graph database 120. Such an explicit request is referred to as an "explicit refresh."

As another example, in-memory graph analytic engine 110 automatically creates, in memory, a most up-to-date version of a graph. This is referred to as an "automatic refresh." An automatic refresh may occur periodically, such as every ten minutes. An automatic refresh of a graph instance may occur regardless of how often the corresponding graph is updated. Alternatively, the frequency of an automatic refresh may vary depending on how often the corresponding graph is updated. For example, as the frequency of updates to a particular graph increases, the frequency with which a new snapshot of the particular graph is created in memory decreases.

The creation of a new graph instance may result in two graph instances (based on the same graph) being stored simultaneously in memory. Alternatively, the newer graph instance may replace the older graph instance in memory. The determination of whether to retain the older graph instance in memory may be based on whether one or more client requests require information (e.g., derived) from the older graph instance. Once all client requests that required the older graph instance have been fulfilled, then the older graph instance may be deleted automatically.

In an embodiment, in-memory graph analytic engine 110 applies delta information to an existing graph instance to create a new snapshot. If none of delta information is stored in persistent storage (i.e., graph database 120), then no disk accesses are required at all. Even if at least a portion of the delta information is stored in persistent storage, the number of disk accesses to retrieve the delta information is significantly less than the number of disk accesses that would be required if the entire graph is read into memory from persistent storage. Thus, applying delta information to an existing graph instance is significantly faster than loading the corresponding graph from persistent storage. For example, initial loading of a billion-edge graph from persistent storage may take thirty minutes while applying delta information to the corresponding graph instance in memory may take only two minutes.

As noted previously, the changes reflected in the delta information for a particular graph may be sorted. The one or more sorting criteria may include node identifier (ID). Using a sorted log, a new snapshot may be created with only one scan over a corresponding graph instance. Without a sorted log, a graph instance may require multiple scans in order to create a new snapshot using the delta information.

Figure 3:
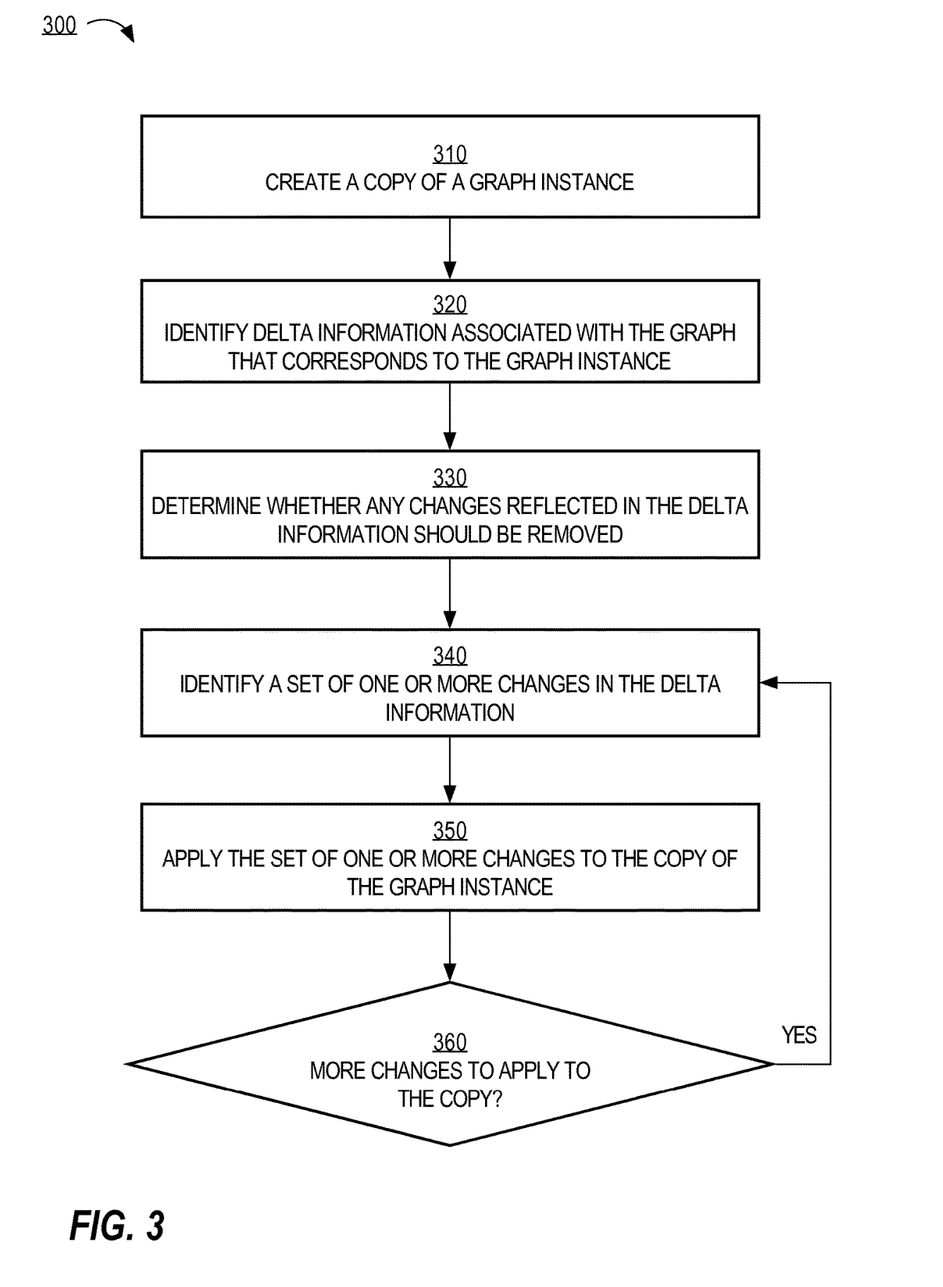
FIG. 3 is a block diagram that depicts a process for applying delta information to a graph instance, in an embodiment.

FIG. 3 is a block diagram that depicts a process 300 for applying delta information to a graph instance, in an embodiment. Process 300 may be performed by in-memory graph analytic engine 110 or one or more processes associated with in-memory graph analytic engine 110. In fact, process 300 may be applied in parallel.

At block 310, a copy of the graph instance is created. Thus, changes to the corresponding graph (hereinafter "particular graph") will be made to the copy instead of to the current graph instance. In a different embodiment, the changes are made to the current graph instance directly. Thus, block 310 would be skipped.

Block 310 may be performed as part of an explicit refresh or an automatic refresh.

At block 320, delta information associated with the particular graph is identified. In-memory graph analytic engine 110 may obtain delta information in one of multiple ways. One way is referred to as a "pull-based method." In this method, in-memory graph analytic engine 110 requests, from graph database 120, changes for a particular graph. Such a request may be initiated in response to a client request (e.g., from client 102) or automatically according to, for example, a scheduled interval. The delta information may be stored in an undo log that is stored in graph database 120. Alternatively, the delta information may be stored in another log that is not used for undo.

Another way in which in-memory graph analytic engine 110 may obtain delta information is referred to as a "push-based method." In this method, in-memory graph analytic engine 110 registers a call-back method to graph database 120. The call-back method is invoked for each change of the graph stored in graph database 120.

At block 330, the delta information associated with the particular graph is analyzed to determine whether any of the changes reflected in the delta information should be removed or otherwise excluded. For example, a client request may request a snapshot as of a certain point of time that is (1) prior to the time associated with one or more changes to the particular graph but (2) subsequent to the time associated with the current graph instance that corresponds to the particular graph. For example, the current graph instance may have a transaction ID of 3456, the transaction ID of the client request is 3678 (which is logically later than 3456), and the certain point of time indicated in the client request corresponds to transaction ID 3591. Thus, one or more changes reflected in the delta information that are associated with a transaction ID that is greater than 3591 may be excluded from being applied to the current graph instance to create a new snapshot.

This "filtering" of block 330 may be performed even if the explicit refresh (or automatic refresh) is for all changes up to the timestamp associated with the refresh because, since the refresh was determined, one or more changes to the particular graph may have been committed and those changes are associated with a later transaction ID and, therefore, should not be reflected in the new snapshot.

Block 330 may also involve removing, from the delta information for the particular graph, changes that are associated with information that is not reflected in the graph instance. For example, some changes may be to one or more properties of a node or edge in graph while the corresponding graph instance does not include those properties. Such properties may not be needed for certain graph analysis operations. Therefore, such properties are not reflected in the graph instance when the graph is loaded into memory from persistent storage.

Block 330 may also involve removing, from the delta information for a particular graph, changes that are considered irrelevant due to subsequent change. For example, if a first change is an addition of a node to the particular graph and a second (subsequent) change is a deletion of the node from the particular graph, then the two changes essentially "cancel" each other out. Thus, both changes may be removed from the delta information prior to applying the delta information to the copy of the current graph instance.

At block 340, a set of one or more changes reflected in the delta information is identified. If the delta information is ordered based on node identifier (e.g., the changes to node 1 are indicated before the changes to node 2), then the first performance of block 340 may involve identifying the set of one or more changes that are associated with the lowest node identifier. Alternatively, the first performance of block 330 may involve identifying the set of one or more changes that are associated with the highest node identifier.

At block 350, the set of one or more changes identified in block 340 is applied to a current graph instance. As noted previously, if multiple changes are made relative to a particular node, then the delta information for that particular node may be grouped together. Change(s) (for the particular node) associated with the lowest transaction ID are applied before change(s) (for the particular node) associated with higher transaction IDs until all the changes for the particular node have been applied.

For example, a first change is an addition of a node and a second (subsequent) change is an update of a property of the node. The first change is applied first to the copy of the graph instance. The second change is then applied to the (new) node in the copy of the graph instance.

Edge addition or deletion may be reflected once in delta information, such as for the source node of the edge that is affected. Thus, an edge addition or deletion may not result in two separate change records: one for the source node and one for the destination node. The change for the destination node may be applied in post-processing step that does not involve the delta information.

In an embodiment, one type of change reflected in delta information is applied to a graph instance before another type of change reflected in the delta information is applied to the graph instance. For example, structural changes (e.g., adding or removing nodes or edges) may be applied to a graph instance first. Such structural changes may be performed sequentially since nodes and edges of a graph may be dependent on each other. Then, all changes to the graph's properties are applied to the graph instance. This latter step may be performed in parallel since node properties and edge properties are independent of each other.

At block 360, it is determined whether there are any more changes to apply to the modified copy of the current graph instance. If so, then process 300 proceeds to block 340. Else, process 300 ends. Block 360 may involve first removing the set of changes applied in block 350 (at least from consideration) from the delta information so that that set of changes is not applied again.

Reverting to a Previous Version of a Graph

In an embodiment, a graph instance may be modified by applying delta information that indicates changes that were made to the corresponding graph prior to creation of the graph instance. For example, in-memory graph analytic engine 110 generates a graph instance automatically upon startup of the node upon which in-memory graph analytic engine 110 executes. Then, in-memory graph analytic engine 110 receives a client request that indicates that a previous version of the graph is requested. For example, the graph instance may correspond to time 7:05 on a particular day and the client request indicates a time of 3:06 on the same particular day.

To revert a graph instance to a previous point in time, in-memory graph analytic engine 110 may create a copy of the graph instance then identify changes that were made to the corresponding graph (and that are reflected in the graph instance) prior to the transaction ID associated with the graph instance and after the transaction ID associated with the previous point in time. As noted previously, the changes may be recorded in an undo log. The changes may be sorted (if not sorted already) based on node identifier. Then, the changes are "applied" to the graph instance on a node-by-node basis in an order dictated by the transaction ID associated with each change.

However, "applying" the changes in this scenario is different than in the case described above where a refresh occurs. For example, if a change is the addition of a node, then then applying the change involves deleting the node from the graph instance (or copy thereof). As another example, if a change is the deletion of a node, then then applying the change involves adding the node to the graph instance (or copy thereof). As another example, if a change is the modification of a value of a particular property of an edge from a first value to a second value, then applying the change involves modifying the current value of the edge (which is the second value) to the first value.

Graph Instances for Multiple Users

As noted previously, graph database system 100 may support multiple clients (or users) and concurrent client requests. Each client may independently request to load a graph from graph database 120. Because a graph instance may be read-only, it is safe to share the graph instance among multiple clients.

In an embodiment, in-memory graph analytic engine 110 (or a related component) keeps track of the number of clients (or users) that are using (or accessing) each graph instance. When a client disconnects from in-memory graph analytic engine 110 or explicitly releases a graph instance, the client number for that graph instance decreases. In-memory graph analytic engine 110 may drop the graph instance from memory if the graph instance is not used by any client. Alternatively, as an optimization, in-memory graph analytic engine 110 may keep the graph instance in a cache for a period of time. Doing so would prevent having to create an identical (or similar) graph instance from the same graph data if a client request for the graph is subsequently received.

As noted previously, there might be multiple graph instances of the same graph maintained by in-memory graph analytic engine 110. For example, two clients (e.g., clients 102 and 104) may start with sharing the same graph instance until one client requests to refresh the graph instance. In this case, assuming resources permit, in-memory graph analytic engine 110 creates a new snapshot for the client while maintaining the previous graph instance for the other client.

In an embodiment, when requesting to load a graph, a client request may specify the required freshness of a graph instance. Possible freshness options include the most up-to-date instance, an instance generated at or during a specified period of time (e.g., a transaction ID or a SCN), or any available instance. If there is a client request to load a graph and there is already a graph instance for the graph in memory, then in-memory graph analytic engine 110 may use the current graph instance if the freshness level associated with the current graph instance satisfies the required freshness associated the client request. Otherwise, in-memory graph analytic engine 110 creates a new graph instance even though there is already a graph instance in memory.

In an embodiment, a client request may be to create a privatized version of a graph. When a privatized version is requested, in-memory graph analytic engine 110 creates a copy of the graph instance and gives it to the user. The user can mutate the privatized version of the graph at will (e.g. sort it by degree or create an undirected version of it), as it is visible only to the user. However, such a graph is transient and does not have to be persisted back in the database by the engine. The user may directly use database to apply his changes to the source data, though.

Example Cluster Graph Database System

In an embodiment, graph database system 100 is implemented to be able to scale to support a relatively large number of users. This is accomplished using multiple graph analytic engines while providing snapshot consistency on a global scale.

In this embodiment, graph database system 100 is a cluster database system that involves multiple instances of an in-memory graph analytic engine, each instance executing on a different node in the cluster. Each node supports multiple client requests and shares the same graph database. Because there is only one graph database and each graph analytic engine guarantees that an SCN-consistent snapshot of a particular graph is created, the snapshot consistency is preserved in a global sense.

Figure 4:
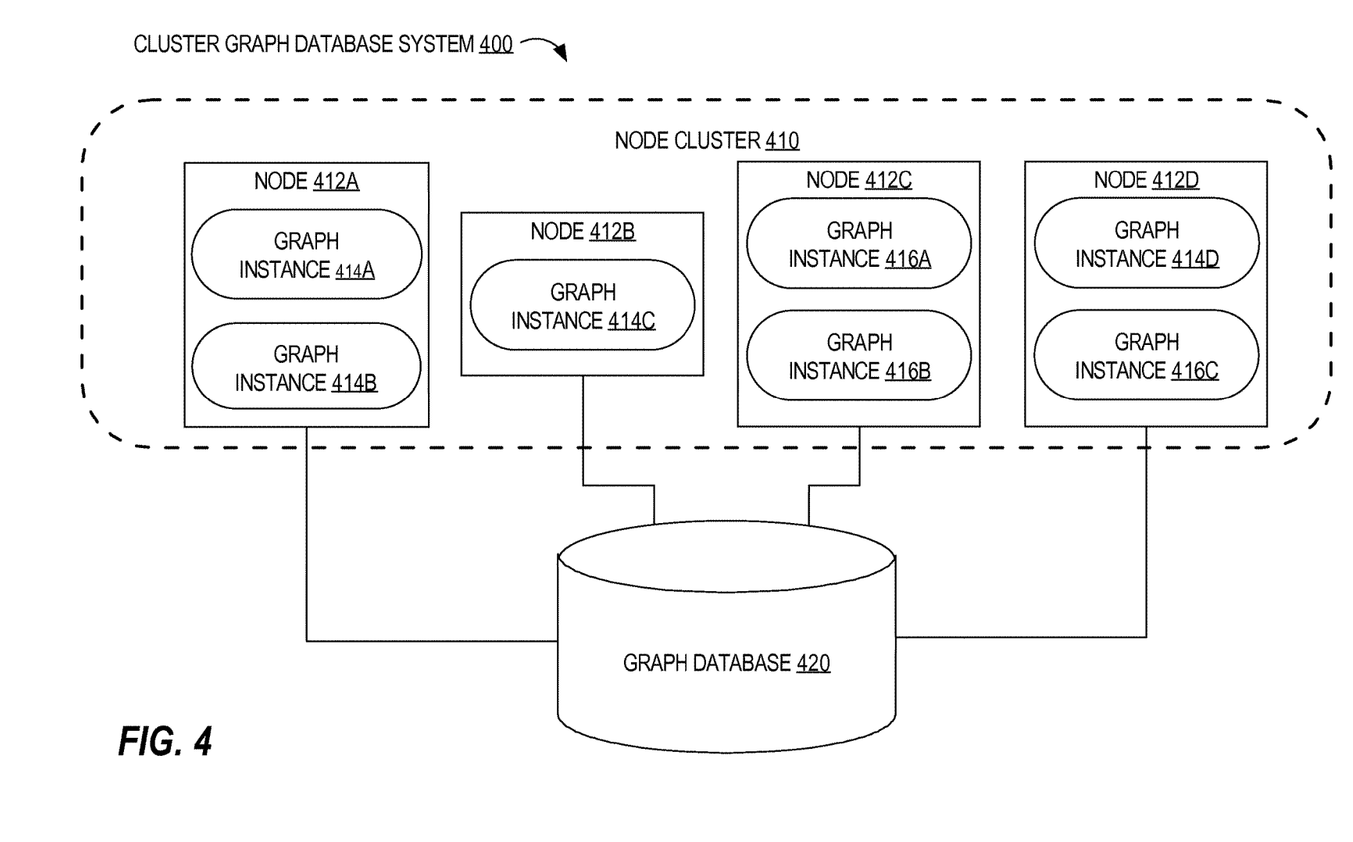
FIG. 4 is a block diagram that depicts an example cluster graph database system, in an embodiment.

FIG. 4 is a block diagram that depicts an example cluster graph database system 400, in an embodiment. Cluster graph database system 400 includes a node cluster 410 and a database 420 that stores graph data for one or more graphs.

Node cluster 410 includes four nodes: nodes 412A-412D. Although four nodes are depicted, node cluster 410 may include more or less nodes.

Each node 412 runs or executes at least one graph analytic engine (not shown). Each graph analytic engine may process multiple instances of the same graph or different graphs concurrently. Each in-memory graph analytic engine on each node 412 may be implemented in hardware, software, or a combination of hardware and software. For example, each node 412 includes one or more processors and memory that stores instructions which, when executed by the one or more processors, implement the functionality of an in-memory graph analytic engine.

Each node 412 is connected to graph database 420, which allows each graph analytic engine to send requests for graph data stored in graph database 420, receive the graph data, and process the graph data.

As depicted in FIG. 4, each node 412 is capable of storing one or more graph instances 414 or 416 in volatile memory. For example, node 412A stores graph instances 414A and 414B, node 412B stores graph instance 414C, node 412C stores graph instances 416A and 416B, and node 412D stores graph instances 414D and 416C. Graph instances 414A-414D correspond to different versions of a graph (that is stored in graph database 420). Similarly, graph instances 416A-416C correspond to different versions of another graph (that is stored in graph database 420).

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
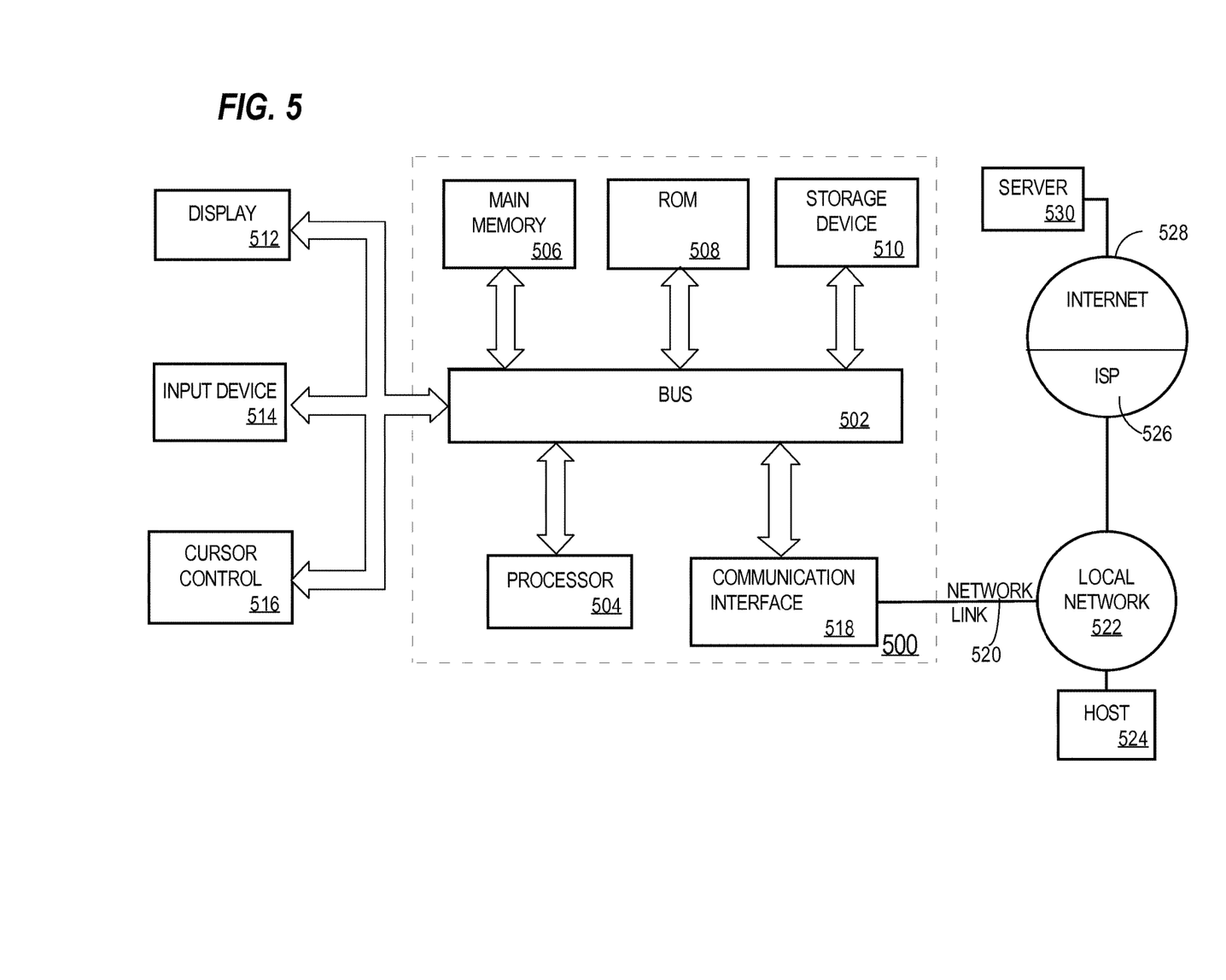
FIG. 5 is a block diagram that illustrates a computer system upon which an embodiment of the invention may be implemented.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 510. Volatile media includes dynamic memory, such as main memory 506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method, performed by one or more computing devices, for snapshot consistency, the method comprising:
    storing, in persistent storage, graph data that includes a first graph that is stored in a first format and that comprises a first plurality of nodes and a first plurality of edges between the first plurality of nodes;
    reading, into volatile memory, a first instance of the first graph, wherein reading comprises processing the first graph to generate the first instance that is stored in a second format that is different than the first format;
    wherein the first instance represents a read-only snapshot of the first graph at a particular point in time;
    while storing the first instance in the volatile memory, receiving a first set of updates to the first graph, wherein the first instance is not modified by the first set of updates;
    wherein the first set of updates includes one or more of:
    an addition of a first node to the first plurality of nodes,
    a deletion of a second node from the first plurality of nodes,
    an addition of a first edge to the first plurality of edges, or
    a deletion of a second edge from the first plurality of edges;
    in response to receiving the first set of updates, storing the first set of updates in the persistent storage;
    after storing the first set of updates in the persistent storage and without updating the first instance, performing one or more first graph analysis operations on the first instance representing the read-only snapshot that has not been modified based on any update in the first set of updates.

2. The method of claim 1, wherein the first set of updates includes
    at least one of:
    a change of a property of a third node in the first plurality of nodes, or
    a change of a property of a third edge in the first plurality of edges.

3. The method of claim 1, further comprising:
    receiving a first client request, wherein storing the first instance of the first graph comprises storing the first instance of the first graph in volatile memory in response to receiving the first client request;
    receiving a second client request that indicates one or more second graph analysis operations to be performed with respect to a least a portion of the first graph;
    in response to receiving the second client request, performing the one or more second graph analysis operations on the first instance.

4. The method of claim 3, wherein:
    the first client request indicates the one or more first graph analysis operations;
    performing the one or more first graph analysis operations comprises performing the one or more first graph analysis operations in response to receiving the first client request.

5. The method of claim 3, wherein:
    receiving the first client request comprises receiving the first client request from a first client;
    receiving the second client request comprises receiving the second client request from a second client that is different than the first client.

6. The method of claim 1, wherein the graph data includes a second graph that comprises a second plurality of nodes and a second plurality of edges between the second plurality of nodes, the method further comprising:
    storing, in the volatile memory, an instance of the second graph;
    while storing the instance of the second graph in the volatile memory, receiving a second set of updates to the second graph;
    in response to receiving the second set of updates, storing the second set of updates in the persistent storage without updating the instance of the second graph;
    after storing the second set of updates in the persistent storage, applying the second set of updates to the instance of the second graph or to a copy of the instance to generate a second instance of the second graph.

7. The method of claim 6, further comprising:
    after receiving the second set of updates and prior to applying the second set of updates, receiving a client request that requests a version of the second graph that is more current than the instance of the second graph;
    wherein applying the second set of updates comprises applying the second set of updates in response to receiving the client request.

8. The method of claim 6, further comprising:
    determining whether one or more refresh criteria are satisfied;
    wherein applying the second set of updates comprises automatically applying the second set of updates in response to determining that the one or more refresh criteria are satisfied and not in response to user input.

9. A method, performed by one or more computing devices, for snapshot consistency, the method comprising:
    storing, in persistent storage, graph data that includes a first graph that comprises a first plurality of nodes and a first plurality of edges between the first plurality of nodes;
    storing, in volatile memory, a first instance of the first graph, wherein the first instance represents a read-only snapshot of the first graph at a particular point in time;
    while storing the first instance in the volatile memory, receiving a first set of updates to the first graph, wherein the first instance is not modified by the first set of updates;
    wherein the first set of updates includes one or more of:
    an addition of a first node to the first plurality of nodes,
    a deletion of a second node from the first plurality of nodes, an addition of a first edge to the first plurality of edges, or a deletion of a second edge from the first plurality of edges;

in response to receiving the first set of updates, storing the first set of updates in the persistent storage; after storing the first set of updates in the persistent storage and without updating the first instance, performing one or more first graph analysis operations on the first instance representing the read-only snapshot that has not been modified based on any update in the first set of updates;

wherein the volatile memory is first volatile memory of a first computing device in a multi-node database system that includes a second computing device that is different than the first computing device;

wherein the graph data includes a second graph that comprises a second plurality of nodes and a second plurality of edges between the second plurality of nodes; wherein the method further comprising storing, in second volatile memory of the second computing device, based on reading at least a portion of the second graph from the persistent storage, a second instance of the second graph.

10. The method of claim 9, wherein the first graph and the second graph are of the same version or different versions of the same graph.

11. The method of claim 1, wherein storing the first instance of the first graph in the volatile memory comprises:

applying one or more filter criteria to the first graph to identify a portion of the first graph, wherein the portion includes one or more nodes of the first plurality of nodes, one or more edges of the first plurality of edges, one or more properties of the first plurality of nodes, or one or more properties of the first plurality of edges;

wherein the first instance does not reflect the portion of the first graph.

12. One or more non-transitory storage media storing instructions for snapshot consistency, wherein the instructions, when executed by one or more processors, cause:

storing, in persistent storage, graph data that includes a first graph that comprises a first plurality of nodes and a first plurality of edges between the first plurality of nodes;

storing, in volatile memory, a first instance of the first graph, wherein the first instance represents a read-only snapshot of the first graph at a particular point in time;

while storing the first instance in the volatile memory, receiving a first set of updates to the first graph, wherein the first instance is not modified by the first set of updates;

wherein the first set of updates includes one or more of: an addition of a first node to the first plurality of nodes, a deletion of a second node from the first plurality of nodes, an addition of a first edge to the first plurality of edges, or a deletion of a second edge from the first plurality of edges;

in response to receiving the first set of updates, storing the first set of updates in the persistent storage;

after storing the first set of updates in the persistent storage and without updating the first instance, performing one or more first graph analysis operations on the first instance representing the read-only snapshot that has not been modified based on any update in the first set of updates;

wherein the graph data includes a second graph that comprises a second plurality of nodes and a second plurality of edges between the second plurality of nodes;

storing, in the volatile memory, an instance of the second graph;

while storing the instance of the second graph in the volatile memory, receiving a second set of updates to the second graph;

in response to receiving the second set of updates, storing the second set of updates in the persistent storage without updating the instance of the second graph;

after storing the second set of updates in the persistent storage, applying the second set of updates to the instance of the second graph or to a copy of the instance to generate a second instance of the second graph.

13. The one or more storage media of claim 12, wherein:

the first instance is stored in a first format and the first graph is stored in a second format that is different than the first format;

the first instance represents a snapshot of the first graph at a particular point in time;

the instructions, when executed by the one or more processors, further cause, while reading the first graph into volatile memory or after reading the first graph into volatile memory, processing the first graph that is stored in the second format to generate the first instance that is stored in the first format.

14. The one or more storage media of claim 12, wherein the first set of updates includes at least one of:

a change of a property of a third node in the first plurality of nodes, or a change of a property of a third edge in the first plurality of edges.

15. The one or more storage media of claim 12, wherein the instructions, when executed by the one or more processors, further cause:

receiving a first client request, wherein storing the first instance of the first graph comprises storing the first instance of the first graph in volatile memory in response to receiving the first client request;

receiving a second client request that indicates one or more second graph analysis operations to be performed with respect to a least a portion of the first graph;

in response to receiving the second client request, performing the one or more second graph analysis operations on the first instance.

16. The one or more storage media of claim 15, wherein:

the first client request indicates the one or more first graph analysis operations;

performing the one or more first graph analysis operations comprises performing the one or more first graph analysis operations in response to receiving the first client request.

17. The one or more storage media of claim 15, wherein:

receiving the first client request comprises receiving the first client request from a first client;

receiving the second client request comprises receiving the second client request from a second client that is different than the first client.

18. The one or more storage media of claim 12, wherein the instructions, when executed by the one or more processors, further cause:

after receiving the second set of updates and prior to applying the second set of updates, receiving a client request that requests a version of the second graph that is more current than the instance of the second graph; wherein applying the second set of updates comprises applying the second set of updates in response to receiving the client request.

19. The one or more storage media of claim 12, wherein the instructions, when executed by the one or more processors, further cause:
- determining whether one or more refresh criteria are satisfied;
- wherein applying the second set of updates comprises automatically applying the
- second set of updates in response to determining that the one or more refresh criteria are satisfied and not in response to user input.

20. The one or more storage media of claim 12, wherein:
- the volatile memory is first volatile memory of a first computing device in a multi-node database system that includes a second computing device that is different than the first computing device;
- the graph data includes a second graph that comprises a second plurality of nodes and a second plurality of edges between the second plurality of nodes;
- the instructions, when executed by the one or more processors, further cause storing, in second volatile memory of the second computing device, based on reading at least a portion of the second graph from the persistent storage, a second instance of the second graph.

21. The one or more storage media of claim 20, wherein the first graph and the second graph are of the same version or different versions of the same graph.

22. The one or more storage media of claim 12, wherein storing the first instance of the first graph in the volatile memory comprises:
- applying one or more filter criteria to the first graph to identify a portion of the first graph, wherein the portion includes one or more nodes of the first plurality of nodes, one or more edges of the first plurality of edges, one or more properties of the first plurality of nodes, or one or more properties of the first plurality of edges;
- wherein the first instance does not reflect the portion of the first graph.

23. The method of claim 1, further comprising:
- while reading at least a portion of the first graph into volatile memory, converting first data values of an attribute of multiple nodes into second data values, wherein the first instance comprises the second data values and not the first data values, wherein the first graph comprises the first data values and not the second data values.

* * * * *

UNITED STATES PATENT AND TRADEMARK OFFICE
CERTIFICATE OF CORRECTION

PATENT NO. : 10,019,536 B2  
APPLICATION NO. : 14/332182  
DATED : July 10, 2018  
INVENTOR(S) : Hong et al.

Page 1 of 1

It is certified that error appears in the above-identified patent and that said Letters Patent is hereby corrected as shown below:

In the Specification

In Column 1, Line 4, above "BACKGROUND" insert -- FIELD OF THE DISCLOSURE The present disclosure relates to a graph database system that supports data management in persistent storage and efficient in-memory graph analytics. --.

In Column 5, Line 13, delete "'color'" and insert -- 'color' --, therefor.

In Column 10, Line 54, delete "that that" and insert -- that --, therefor.

In the Claims

In Column 16, Line 3, in Claim 3, delete "to a least" and insert -- to at least --, therefor.

In Column 18, Line 41, in Claim 15, delete "to a least" and insert -- to at least --, therefor.

Signed and Sealed this  
Second Day of April, 2019

Andrei Iancu  
*Director of the United States Patent and Trademark Office*